United States Patent
Nilsson

[11] Patent Number: 5,439,557
[45] Date of Patent: Aug. 8, 1995

[54] METHOD OF RECOVERING ENERGY AND CHEMICALS FROM A SPENT LIQUOR USING LOW FREQUENCY SOUND IN A RECOVERY BOILER

[75] Inventor: Bengt Nilsson, Skoghall, Sweden

[73] Assignee: Gotaverken Energy Aktiebolag, Goteborg, Sweden

[21] Appl. No.: 150,126

[22] PCT Filed: May 25, 1992

[86] PCT No.: PCT/SE92/00350
§ 371 Date: Nov. 30, 1993
§ 102(e) Date: Nov. 30, 1993

[87] PCT Pub. No.: WO92/21815
PCT Pub. Date: Dec. 10, 1992

[30] Foreign Application Priority Data
May 30, 1991 [SE] Sweden ............... 9101648

[51] Int. Cl.⁶ ............................ D21C 11/04
[52] U.S. Cl. ................ 162/30.11; 162/30.1; 162/31; 162/50; 431/1; 431/186
[58] Field of Search ...... 162/30.1, 30.11, 31, 162/50; 422/185, 186.16, 186; 423/DIG. 3; 931/1, 186

[56] References Cited
U.S. PATENT DOCUMENTS
3,064,619 11/1962 Fortman ............... 116/137
4,359,950 11/1982 Leffler et al. ............. 110/188
4,857,282 8/1989 Mullen ................. 423/207

FOREIGN PATENT DOCUMENTS
0383565 2/1990 European Pat. Off. .
458799 7/1990 Sweden .

Primary Examiner—W. Gary Jones
Assistant Examiner—Dean T. Nguyen
Attorney, Agent, or Firm—Cushman Darby & Cushman

[57] ABSTRACT

A method of recovering energy and chemicals from a spent liquor which, after thickening to a dry content of 50-90%, is fed into a reaction chamber (1) in which a plurality of temperature zones are maintained, said method comprising the steps of (a) converting the liquid phase in the spent liquor to a steam phase, (b) thermally decomposing the spent liquor to form gaseous organic substances and solid and/or molten organic and inorganic substances, (c) reducing and (d) oxidizing said substances produced during the thermal decomposition, oxygen or oxygen-containing gas being supplied to the reaction chamber (1) in a controlled amount in order to maintain the reactions, which comprise combustion of organic substances, and a bed of said solid and/or molten substances being formed in a lower temperature zone in the reaction chamber (1). According to the invention said steps are carried out during exposure to low frequency sound.

10 Claims, 1 Drawing Sheet

METHOD OF RECOVERING ENERGY AND CHEMICALS FROM A SPENT LIQUOR USING LOW FREQUENCY SOUND IN A RECOVERY BOILER

BACKGROUND OF THE INVENTION

1. Field of the Invention

The present invention relates to a method of recovering energy and chemicals from a spent liquor.

2. Description of Related Art

EP-A1-0 383 565 describes a process and apparatus for carrying out endothermic reactions by using a pulse combustor provided with resonant tubes which are immersed in a fluidized bed of solid particles in a reaction zone to provide indirect heat from the pulsating combustion gases to the bed of solid particles. Black liquor is introduced into the fluidized bed of solid particles and gasified without adding any oxygen and without any molten products being formed. The pulse combustion produces velocity oscillations of about 20 Hz in frequency and acoustic dynamic pressure levels of at least about 165 dB. An acoustic field is emitted from the resonant tubes into the bed of solid particles. However, it is not clear from EP '565 that the sound in the reaction zone, in which gasification of the black liquor occurs, is of the same low frequency and high sound level as produced by the pulse combustion inside the resonant tubes. The solid particles in the bed would have a damping effect on the sound in the reaction zone. Only a fractional part of the sound effect (the decibel number produced) will be propagaded to the surroundings where the black liquor is gasified. Furthermore, the conditions in the reaction zone are essentially different from those prevailing in a soda recovery unit in which the air is supplied in a controllable manner in order to maintain different reaction levels with reduction and oxidation as will be explained below.

The combustion of spent liquors from the cellulose industry is carried out in a soda recovery unit, this constituting the largest and most expensive unit in a sulphate pulp factory. The reason for the central role of the soda recovery unit is that the chemical content from the digesting liquor is recovered therein while at the same time the wood substances are used for the production of steam. It is often the soda recovery unit that determines the capacity of the sulphate factory as a whole since there is very little possibility of gradually increasing its capacity.

The soda recovery unit differs from a steam boiler in several respects: The spent liquor fed in contains water and inorganic substances. The reactions occur in several zones in both reducing and oxidizing environment. Inorganic constituents are recovered as molten material with most of the sulphur in reduced form. There is considerable transfer of dust due to the large content of inorganic substance in the fuel and there is the risk of hydrogen sulphide emission.

The evaporated liquor—thick liquor—is sprayed into a hearth through a number of liquor spray nozzles. A reducing zone is maintained a short distance below the liquor spray nozzles, while an oxidizing zone is maintained higher up in the recovery boiler, for example, above the liquor spray nozzles. The oxidizing and reducing zones are controlled by the addition of air at different levels, for example, primary, secondary and tertiary air. The drops of thick liquor dry and are subjected to gasification on their way down to and on the melt bed. Most of the organic substances are decomposed during gasification. At the same time a considerable amount of hydrogen sulphide is emitted, as well as some sodium and sodium hydroxide in gaseous form.

The bed consists of inorganic substances and 5–10 per cent by weight carbon. Sodium sulphate is reduced to sodium sulphide in the bed. Hydrogen sulphide is also formed and is absorbed by sodium carbonate or leaves the bed in gaseous form. Where the primary air encounters the bed surface the sulphide is very easily re-oxidized to sulphate.

More air—tertiary air—is added at the level above the liquor spray nozzles, so that the environment becomes oxidizing. The hydrogen sulphide formed from the drops of liquor and the bed is oxidized to sulphur dioxide and the organic substance is almost fully combusted to carbon dioxide and water. The degree of combustion is determined by how well the secondary and tertiary air is mixed into the hot gases.

Sodium in the gas phase reacts with sulphur dioxide which has been formed and oxygen from the air to produce sodium sulphate in the form of a fine-particled dust. If there is an excess of sodium, sodium carbonate will also be produced which is subsequently removed and returned to the thick liquor.

The substances leaving the soda recovery unit are primarily sulphur dioxide and sodium sulphate. Hydrogen sulphide may also be present in small quantities. This occurs if insufficient air is supplied or if mixing in the gas phase was too poor. Particularly in large recovery boilers it may be difficult to achieve sufficient mixing—turbulence—when the air is added, which means that zones of reducing atmosphere may occur periodically a long way up in the soda recovery unit. A certain excess of air must be maintained if low hydrogen sulphide emission is to be ensured. However, increased excess air results in lower steam production. The more uniform the distribution of air is, the lower the excess of air can be kept.

The conditions influencing the emission of sulphur dioxide from the recovery boiler include the temperatures in each zone and the air supply, air distribution and penetrating action of the air.

The temperature is dependent on a number of variables, primarily the heat value and dryness content of the thick liquor and the relative air supply. The hydrogen sulphide emission, and thus also the sulphur dioxide emission, increases the lower the temperature in both the level where the black liquor is sprayed in and the bed. The temperature in the interior of the bed is normally about 800° C. but varies in different parts of the bed. Black patches may be formed temporarily due to poor air penetration, in which the temperature may drop towards 600° C. These cooler parts cause a great deal of the hydrogen sulphide to be emitted.

Contrary to the sulphur emission, the sodium emission is promoted by high temperatures. High temperatures at the bed and primary air level will cause the emission of sodium to increase considerably. All the sodium is bound to sulphur dioxide or carbon dioxide and produces dust. The dust emission from the soda recovery unit amounts to 50–70 kg per ton of pulp. In order to avoid lower degrees of reduction, alkali losses and unnecessary recirculation of sodium sulphate, the dust emission should not be too great. At the same time the emission of sulphur dioxide must be minimized. The temperature dependence of sulphur emission and sodium emission is the reverse, for example, high sulphur dioxide emission at lower temperature and high sodium emission (dust emission) at higher temperature. The discharge situation is minimized at a hearth temperature of about 1050° C. It is extremely important that the temperature be kept at a uniform level. An uneven temperature distribution through the recovery boiler will result in a high emission of both sodium and sulphur.

When older soda recovery units are utilized for higher capacity there will be increased sulphur dioxide emission which is partly caused by the formation of zones. If the recovery boiler is new or is provided with efficient fan equipment, using it for higher capacity will only result in higher temperature and hence increased dust emission.

The melt from the bed contains approximately 30% sodium sulphide and some sodium sulphate which has not been reduced. The sulphur in the sodium sulphide gives the white liquor—the digesting liquid—its desired sulphidity for better lignin release and pulp having higher strength properties.

As mentioned earlier, the degree of reduction is dependent on the temperature in the bed and the quantity of air and how it is distributed and penetrates into the bed. The quantity and distribution of air are also of significance to the thermal economy. The quantities of primary and secondary air shall be suitably balanced. The primary air is added immediately above the bed. If too much primary air is added or it is supplied in unsuitable manner, some of the sodium sulphide will be oxidized to sodium pulphate and the degree of reduction is thus lowered. On the other hand if too little primary air is added or its distribution and penetration is poor, this may result in the temperature of the bed being too low and the melt therefore having difficulty in running out. The height of the bed will then increase, thus blocking the openings for the primary air.

The distribution of air added and its penetrating action and mixture into the flue gases are thus vital factors for the function of the soda recovery unit. The two most important operating parameters, the degree of reduction and the carbon conversion, are thus entirely dependent on the operating conditions in the lower, reducing zone of the recovery boiler, for example, the region from a little way below the liquor spray nozzles down to and including the bed. The energy development above the bed determines the emission of sulphur and sodium, the level and variation of the reduction degree, and the operating stability in general. The conditions above the bed are therefore decisive to the capacity, stability and availability of the soda recovery unit.

All soda recovery units in use utilize a combination of drying and drop gasification (free-falling drops of liquor) and coke bed gasification. The surface of the bed consists partly of residual coke and partly of dried thick liquor, drying and gasification thus take place in parallel with the coke gasification in the bed. The gasification rate is influenced by both the oxygen concentration and the gas velocity. The gasification rate can also be expressed as a flow of gases from the bed surface or as a flow of oxygen to the bed.

One important way of increasing the capacity of a soda recovery unit comprises maximising the coke-bed gasification, which is thus limited by the mass transport of the oxygen. The slowest step in the gasification process is the diffusion of the oxygen to the surface of the coke for final oxidation of the residual coke.

The above shows the complexity of the soda recovery unit process. With current technology it is practically impossible to achieve total optimization. This is accentuated by the trend towards ever increasing cross-sectional areas in the soda recovery unit, with the resultant uneven distribution of temperature. Attempts have been made to improve the distribution and penetrating action of the air in the lower, reducing part by increasing the number of points for the addition of air. This trend is also evident in the upper oxidizing part where air and gas are mixed. Despite all efforts, the result merely emphasizes the complexity of the soda recovery unit by continuous material transfer and condensation on the tubes in the upper parts of the recovery boiler entailing regular shutdowns in order to chip off the material.

Another problem specific to soda recovery units is the collection of dust in what is known as the economizer. This is usually dealt with by steam-operated soot blowing equipment or ball cleaning equipment.

The object of the present invention is to improve the recovery of energy and chemicals from spent liquor by intensifying and stabilizing the chemical reaction processes and physical processes in a combined combustion and gasification furnace of the soda recovery unit type. The invention enables more stable operating conditions, increased capacity, higher degree of carbon conversion, higher degree of reduction and more economic operation.

SUMMARY OF THE INVENTION

An embodiment of the invention relates to a method for recovering energy and chemicals from a spent liquor, characterized in that the method is carried out during exposure to low frequency sound.

The method can be applied, for example, to a soda recovery unit. After thickening the spent liquor to a dry content of 50-90%, it is continuously fed in finely divided form into a reaction chamber in which a plurality of temperature zones are maintained. The liquid phase of the spent liquor is converted to a steam phase and thermally decomposed to produce gaseous organic substances and solid and/or molten organic and inorganic substances. The produced substances are reduced and oxidized during the thermal decomposition, oxygen or oxygen-containing gas being supplied to the reaction chamber in a controlled amount in order to maintain the reactions, which comprises combustion of organic substances, and a bed of the solid and/or molten substances is formed in a lower temperature zone in the reaction chamber. The method being carried out during exposure to low frequency sound.

DETAILED DESCRIPTION OF PREFERRED EMBODIMENTS

Figure 1:
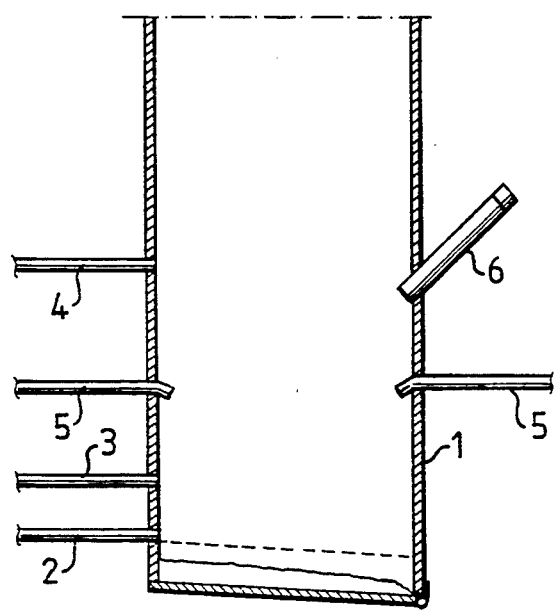
FIG. 1 shows schematically the lower section of a soda recovery unit which is used for carrying out the method according to the invention.

The invention will be described further with reference to the drawing.

The section of the soda recovery unit schematically shown comprises a furnace 1 provided with an inlet 2 for the supply of primary air, at least one inlet 3 for the supply of secondary air, and at least one inlet 4 for the supply of tertiary air, said inlets being disposed at a distance from each other in order to define a lower reduction zone in connection with the inlet 2 for the supply of the primary air, a drying zone in connection with the inlet 3 for the supply of the secondary air, and an oxidizing zone in connection with the inlet 4 for the supply of tertiary air. Liquor spray nozzles 5 for the supply of spent liquor are disposed above the level for the inlet 3 for the supply of spent liquor. According to the invention a sound generator 6 is disposed at a level situated between the inlet 4 for the supply of tertiary air and the liquor spray nozzles 5. The orifice of the sound generator 6 is positioned in the furnace 1 so that the low frequency sound is propagated directly to all spaces of the furnace. If desired, a second sound generator may be disposed on the diametrically opposed side of the furnace.

The invention involves a simple method to supplement a traditional soda recovery unit and thereby intensifying and stabilizing conditions in, particularly, the lower part of the furnace and the various reaction steps. Briefly, the soda recovery unit process is optimized throughout thanks to overall intensified supply of air with penetration on both macro and micro scale.

The recovery process in the soda recovery unit comprises several steps, for example, chemical recovery which is extremely difficult to optimize, as well as the actual gasification of organic material. Thick liquor contains about 25% of inorganic material and thus constitutes the industrial fuel with the highest content of ash for the production of steam and power.

According to the invention, a low frequency sound is maintained by means of one or more sound generating means in connection with the primary, secondary and tertiary air supplies or at other suitable points. The sound generating means may be of any suitable low frequency sound generator. The infrasound oscillates the gas and the particles suspended therein by means of cyclic contractions and expansions so that the laminar gas layers around the particles are disintegrated. This causes greatly increased contact between the suspended particles and the gas surrounding them, thanks to the well developed macro and micro turbulence arising due to the influence of the low frequency sound. New attack points for chemical reactions are thus constantly created.

The use of low frequency sound results in essential improvements in the gasification system described, entailing improved transportation of the reaction substances with the aid of low frequency sound. The velocity of the oxygen molecules on their way to the particles with their carbon content and other organic substance is dependent on the diffusion resistance in the laminar gas layer nearest the surface of each particle. The reaction rate therefore increases thanks to the turbulence in the laminar layer achieved by the method according to the invention. The slowest step in the gasification process is the final oxidation of the residual coke. This step is also governed by the transport of the oxygen and water-steam molecules through the laminar boundary layer surrounding the particles. The reaction substances in the gas phase must thus pass in to the glowing coke particle through the gas layer which surrounds it. Thus the degree of carbon conversion is also improved thanks to the method described.

All chemical reactions in the soda recovery unit can thus take place under greatly improved operating conditions and, at the lower part of the recovery boiler, with lower stoichiometry than is the case for equivalent conventional soda recovery unit technology.

This ensures stable reducing conditions and thereby a higher degree of reduction, which in turn means less oxidized sulphur in the form of sodium sulphate, sodium sulphite and sodium thiosulphate, for example, lower ballast.

The invention is applicable to spent liquors from both sulphate and sulphite processes.

The low frequency sound has a frequency of at most 150 Hz, preferably at most 40 Hz and most preferably at most 20 Hz.

The under-stoichiometric supply of oxygen may occur at one or more places above the bed of solid and/or molten material.

According to a particular embodiment, the supply of oxygen in an under-stoichiometric quantity is effected at least partially from below and up through the bed of solid and/or molten material.

I claim:

1. A method of recovering energy and chemicals from a spent liquor which, after thickening to a dry content of 50–90%, is continuously fed in finely divided form into a reaction chamber of a soda recovery boiler in which a plurality of temperature zones are maintained, said method comprising the simultaneous steps of:
    (a) converting a liquid phase in said spent liquor to a steam phase;
    (b) thermally decomposing said spent liquor to produce gaseous organic substances and at least one of solid and molten organic and inorganic substances; and
    (c) reducing said solid and molten substances and oxidizing said gaseous substances produced during said thermal decomposition, wherein said steps a, b and c are exposed to low frequency sound, and wherein oxygen or oxygen-containing gas being supplied to said reaction chamber in a controlled amount in order to maintain reactions comprising combustion of organic substances, and a bed of said at least one of solid and molten substances being formed in a lower temperature zone in said reaction chamber.

2. A method as claimed in claim 1, wherein said spent liquor comprises residual products from the production of sulphate pulp, said products containing sodium and sulphur.

3. A method as claimed in claim 1, wherein said spent liquor comprises residual products from the production of sulphite pulp.

4. A method as claimed in claim 1, wherein said low frequency sound has a frequency of at most 150 Hz.

5. A method as claimed in claim 1, wherein under-stoichiometric supply of oxygen is carried out at one or more places above said bed of at least one of solid and molten material.

6. A method as claimed in claim 1 or 5, wherein under-stoichiometric supply of oxygen is carried out at least partially from below and up through said bed of at least one of solid and molten material.

7. A method as claimed in claim 1, wherein said low frequency sound is generated by at least one sound generating means.

8. A method as claimed in claim 1, wherein said low frequency sound has a frequency of at most 40 Hz.

9. A method as claimed in claim 1, wherein said low frequency sound has a frequency of at most 20 Hz.

10. A method as claimed in claim 1, wherein said low frequency sound has a frequency which oscillates said at least one of molten and solid substances and gases surrounding said at least one of molten and solid substances by means of cyclic contractions and expansions so that a laminar gas layer around said at least one of molten and solid substances is disintegrated whereby contact between said at least one of molten and solid substances and said surrounding gases is increased.

* * * * *